United States Patent

[11] 3,570,370

| [72] | Inventor | William Ristau<br>Detroit, Mich. |
|---|---|---|
| [21] | Appl. No. | 825,798 |
| [22] | Filed | May 19, 1969 |
| [45] | Patented | Mar. 16, 1971 |
| [73] | Assignee | Speedring Corporation<br>Warren, Mich. |

[54] LATHE TRACER STYLUS
2 Claims, 5 Drawing Figs.

[52] U.S. Cl. ............................................... 90/62,
82/14, 33/23
[51] Int. Cl. ........................................... B23q 35/26
[50] Field of Search.................................... 90/62,
13.05; 82/14; 51/100; 33/27 (K), 23 (K); 74/568;
30/357, 307

[56] References Cited
UNITED STATES PATENTS

| 2,038,949 | 4/1936 | Mintz.......................... | 90/13.05 |
| 2,717,013 | 9/1955 | Zwalenburg................. | 33/41UX |

*Primary Examiner*—Gill Weidenfeld
*Attorney*—Barnard, McGlynn & Reising

ABSTRACT: A stylus for a lathe tracer having a relatively flat body member with a template-engaging edge portion of varying contour so that the relationship between a lathe-cutting bit controlled by the stylus and a workpiece can be changed by engaging the template with a different point on the edge portion.

Patented March 16, 1971　　　3,570,370

INVENTOR.
William Ristau
BY
Bernard, McElynn & Riesing
ATTORNEYS

LATHE TRACER STYLUS

This invention relates generally to lathes and similar machines, and is particularly concerned with a lathe tracer stylus for controlling and guiding the cutting bit of a lathe by engagement with a template.

It is conventional to control and guide the cutting bit of a lathe by a tracing mechanism in accordance with the path of a stylus carried by the tracing mechanism as the stylus follows the contour of a template. The contour of the workpiece engaged by the cutting bit is determined by the path of movement of the stylus over the periphery of the template. When the relationship between the template and the tracing mechanism is changed, there is a corresponding change in the relationship between the cutting bit and workpiece. Stated another way, the position of the cutting bit relative to the workpiece is determined by the position of the tracing mechanism relative to the template.

The normal wear on a cutting bit after extended use in cutting duplicate parts from a workpiece introduces error into the dimensions of the pieces being cut by the bit. The present practice is either to replace the cutting bit or the tracing stylus to eliminate the error. Replacing the bit or stylus is both time consuming and expensive and requires the machine to be shut down until the replacement is completed. Frequently, the error can be eliminated only by a trial and error replacement of the stylus with a stylus selected from a group of different sized styluses.

An object of this invention is to provide a stylus that can be adjusted while on the machine to correct errors in the cutting operation.

A further object is to provide a Lathe-tracing stylus having a template-engaging peripheral edge with a varying contour so that the relationship between a cutting bit controlled by the stylus and the workpiece can be changed by presenting a different portion of the peripheral edge of the stylus to the template.

In carrying out the foregoing, and other objects, a stylus according to the present invention comprises a body member having a peripheral template-engaging portion for guiding and controlling a lathe-cutting bit over a workpiece. The peripheral portion of the stylus has a varying contour such that by engaging a template with a different point thereon, the relationship or position of the cutting bit of the lathe relative to the workpiece is adjusted.

Preferably, the stylus has a body member with a pair of spaced parallel flat side surfaces joined by a template-engaging peripheral edge, the peripheral edge varying from a relatively sharp cross section to a relatively blunt cross section whereby the relationship between the template engaged by the stylus and the cutting bit controlled thereby can be changed by engaging the template with a different portion of the peripheral edge of the stylus.

Other objects, advantages and features of the invention will become apparent from the following description taken in connection with the accompanying drawings in which.

Figure 1:
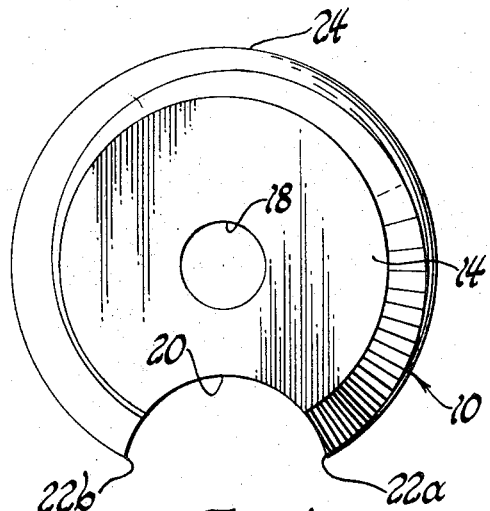
FIG. 1 is a plan view of a stylus embodying the present invention.
Figure 2:
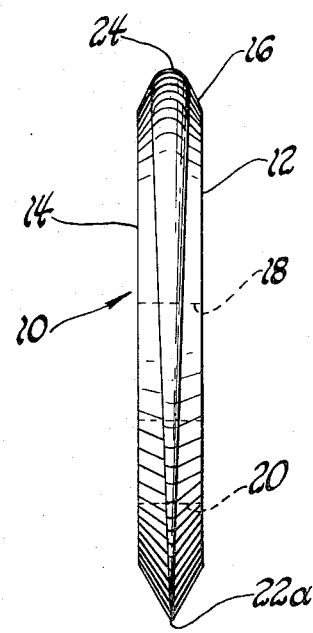
FIG. 2 is an edge view of the stylus of FIG. 1 slightly enlarged.

Referring to FIG. 1, reference numeral 10 designates a stylus according to the present invention having a circular body member with a pair of spaced parallel side surfaces 12 and 14 joined by a peripheral template-engaging edge portion 16. An axial opening 18 is provided in the body for mounting the stylus on a holder in a manner to be described below. As shown in FIG. 1, a notch 20 is provided in the body of the stylus which intersects the peripheral edge of the stylus.

The cross section of the peripheral edge portion 16 varies from a knife edgelike cross section as indicated at 22a at one end of the notch 20 to a relatively blunt cross section at the other end 22 of notch 20. Stated another way, the radius of the peripheral edge portion 16 in cross section varies from a minimum as indicated at reference numeral 22a to a maximum at 22b. The radius of the peripheral edge portion diametrically opposite notch 20 as indicated at 24 is intermediate the radii at 22a and 22b.

Figure 3:
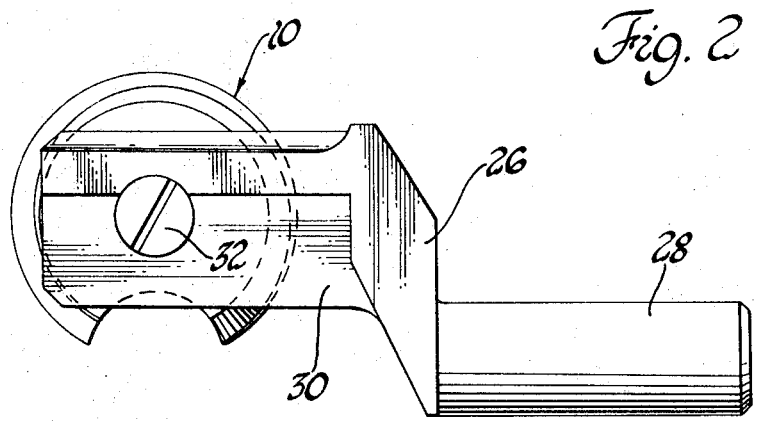
FIG. 3 is a plan view of the stylus of FIGS. 1 and 2 mounted in a holder adapted to be supported in a lathe tracing mechanism.

FIG. 3 illustrates a holder 26 for the stylus 10 having a shank 28 adapted to be mounted in a tracing mechanism and a bifurcated portion 30 having openings therein for receiving a fastener 32 which extends through opening 18 to mount the stylus 10 on the holder 26.

Figure 4:
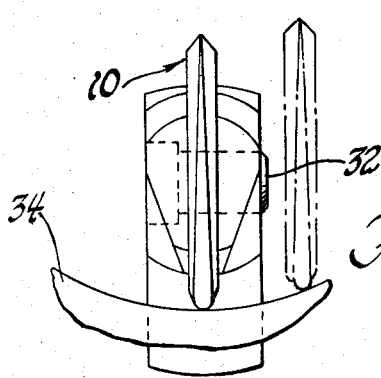
FIG. 4 is a fragmentary plan view of a template engaged by a stylus according to the present invention.

FIG. 4 illustrates a template 32 engaged by the peripheral edge portion 16 of the stylus 10. By rotating the stylus 10 about the axis of hole 18, the distance between the point of contact between the edge portion 16 and the template and the tracing mechanism is changed so that the corresponding relationship between the cutting bit controlled by the stylus and the workpiece is changed. Consequently, substantially infinite adjustment is obtainable by the illustrated stylus by merely rotating the stylus about the axis of hole 18 in the holder 26.

Figure 5:
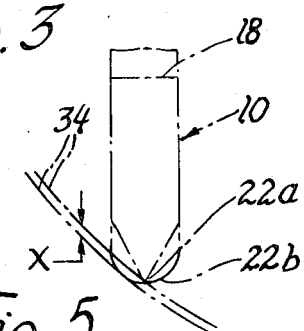
FIG. 5 is an enlarged, exaggerated view illustrating the change in the position of a template relative to the mounting hole of the stylus when different portions of the periphery of the stylus engage the template.

When the stylus is engaged with the template 34 as shown in FIG. 5, the template moves a distance $x$ relative to the hole 18 of the stylus when the point of engagement is changed from the area of the peripheral edge portion 16 adjacent 22a to the portion adjacent 22b.

This can be done by the operator without shutting down the machine, and eliminates the requirement for replacing the bit after wear on the bit introduces error in the dimensions of the workpiece.

While a specific form of the invention has been illustrated and described in the foregoing specification and accompanying drawings, it should be understood that the invention is not limited to the exact construction shown, but that various alternative constructions, all falling within the scope and spirit of the invention, will be apparent to those skilled in the art.

I claim:

1. A lathe tracer stylus comprising: a circular body member having a pair of spaced, parallel side surfaces joined by a peripheral edge engageable with a template for guiding and controlling a lathe-cutting bit relative to a workpiece; a notch in said body member intersecting said peripheral edge; said peripheral edge having a cross section gradually varying from a substantial knife edge at one end of said notch to a relatively blunt edge at the other end of said notch, and mounting means on said stylus to permit the stylus to be selectively positioned in a holder around its axis to allow any part of said gradually varying peripheral edge to engage said template.

2. A stylus for a lathe tracer comprising: a relatively flat body member having a template-engaging peripheral edge for guiding and controlling a lathe-cutting bit over a workpiece; said peripheral edge gradually varying from a relatively sharp edge cross section to relatively blunt edge cross section; and a holder adapted to be mounted in a lathe-tracing mechanism, said body being mounted on said holder and said body being selectively positionable on said holder to permit any portion along said gradually varying edge to engage a template whereby the relationship between a lathe cutting bit and a workpiece controlled by the stylus and said template can be changed by engaging the template with a different portion of said peripheral edge.